(12) United States Patent
Murasaki et al.

(10) Patent No.: US 6,678,924 B2
(45) Date of Patent: Jan. 20, 2004

(54) INTEGRAL MOLDED SURFACE FASTENER, AND CONTINUOUS MANUFACTURING METHOD AND CONTINUOUS MANUFACTURING APPARATUS THEREFOR

(75) Inventors: Ryuichi Murasaki, Toyama-ken (JP); Mitsuru Akeno, Toyama-ken (JP); Shintaro Ohsugi, Toyama-ken (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 10/091,554

(22) Filed: Mar. 7, 2002

(65) Prior Publication Data

US 2002/0124359 A1 Sep. 12, 2002

(30) Foreign Application Priority Data

Mar. 8, 2001 (JP) .......................................... 2001-64460

(51) Int. Cl.$^7$ ........................... A44B 18/00; B29C 43/00
(52) U.S. Cl. ............................. 24/452; 24/306; 24/442; 24/443; 24/446; 24/450; 264/145; 428/99
(58) Field of Search ........................... 24/452, 451, 450, 24/446, 442, 443, 306, 304

(56) References Cited

U.S. PATENT DOCUMENTS

| | | | |
|---|---|---|---|
| 3,192,589 A | | 7/1965 | Pearson |
| 4,056,593 A | * | 11/1977 | de Navas Albareda ..... 264/145 |
| 4,984,339 A | | 1/1991 | Provost et al. |
| 5,537,720 A | * | 7/1996 | Takizawa et al. ............. 24/452 |
| 5,537,723 A | | 7/1996 | Yoshida et al. |
| 5,685,050 A | * | 11/1997 | Murasaki ..................... 24/442 |
| 5,755,015 A | * | 5/1998 | Akeno et al. .................. 24/452 |
| 5,781,969 A | * | 7/1998 | Akeno et al. .................. 24/452 |
| 5,913,482 A | * | 6/1999 | Akeno ........................... 24/452 |
| 5,953,797 A | * | 9/1999 | Provost et al. ................ 24/452 |
| 5,985,406 A | * | 11/1999 | Takizawa et al. ............. 428/99 |
| 6,061,881 A | * | 5/2000 | Takizawa et al. ............. 24/446 |
| 6,248,276 B1 | | 6/2001 | Parellada et al. |

FOREIGN PATENT DOCUMENTS

| | | |
|---|---|---|
| EP | 0 324 577 A1 | 7/1989 |
| EP | 0 988 808 A1 | 3/2000 |
| GB | 2 349 354 | 11/2000 |
| JP | 02-005947 | 1/1990 |
| JP | 06-133808 | 5/1994 |
| JP | 08-508910 | 9/1996 |
| JP | 09-322812 | 12/1997 |
| JP | 11-056413 | 3/1999 |
| WO | WO 94/23610 | 10/1994 |
| WO | WO 98/57565 | 12/1998 |

OTHER PUBLICATIONS

United Kingdom Report for Application No. GB 0204729.8 dated Aug. 28, 2002.

* cited by examiner

*Primary Examiner*—Victor Sakran
(74) *Attorney, Agent, or Firm*—Finnegan, Henderson, Farabow, Garrett & Dunner, L.L.P.

(57) ABSTRACT

An integral molded surface fastener is provided having minute and peculiar engaging elements, with which a desired plasticity and tearing strength of the flat substrate are secured. The molded surface fastener may be formed together with the substrate by continuous molding where the engaging elements are each comprised of a single column portion having a substantially cross-shaped section provided by intersection of a first column portion and a second column portion and rectangular thin plate-like engaging heads extended in the shape of wings in opposite directions along the width direction of the first column portion intersecting the second column portion around a top end of the column portion, and having substantially the same width dimension as the width dimension of a top end of the second column portion.

20 Claims, 8 Drawing Sheets

INTEGRAL MOLDED SURFACE FASTENER, AND CONTINUOUS MANUFACTURING METHOD AND CONTINUOUS MANUFACTURING APPARATUS THEREFOR

BACKGROUND OF THE INVENTION

1. Field of the Invention

The present invention relates to a surface fastener obtained by molding a flat substrate and a plurality of engaging elements integrally and continuously using thermoplastic resin, and a manufacturing method and a manufacturing apparatus therefore. More particularly, it relates to an integral molded surface fastener in which the engaging elements are not likely to fall down despite their minute dimensions and engage fine pile pieces such as unwoven fabric securely so as to ensure a necessary engaging force, separation force and a high engaging ratio. Further, this surface fastener being capable of bearing repeated engaging/disengaging operations several times and preferable for particularly, a paper diaper, medical simple clothes, napkins, various kinds of working simple clothes, underwear and the like, and a continuous manufacturing method and a continuous manufacturing apparatus for the surface fastener are related to.

2. Description of the Related Art

In recent years, the surface fastener having a plurality of the engaging elements of minute dimension integrally on a flat substrate obtained by injecting thermoplastic resin continuously has been used in various fields as a fastener of a disposable paper diaper, medical simple clothes, napkins, various kinds of working simple clothes, underwear and the like. Forms of this kind of the engaging element of an integral molded surface fastener are divided largely to hook type and mushroom type as well known in a related filed.

A typical hook type integral molded surface fastener has been disclosed in for example, U.S. Pat. Nos. 4,984,339 and 5,537,723. According to these molded surface fasteners, molten resin is supplied to the circumferential face of a cylindrical drum, in which a plurality of substantially J-shaped cavities while each cavity is curved from an inside of the drum and opened to the circumferential face are formed, so as to mold a thin plate-like substrate along the circumferential face. At the same time, the cavities are filled with part of the molten resin so as to mold an inverted J-shaped hook integrally with the rear face of the substrate. After cooling, the molded product is separated from the circumferential face of the drum.

Further, an integral molded surface fastener having modified configuration of the aforementioned hook-type engaging elements has been also disclosed in for example, Japanese Patent Application Laid-Open No. 2-5947 and Japanese Patent Application Laid-Open No. 6-133808. In manufacturing these molded surface fasteners, molten resin is extruded from an extruding die having an opening erected in a substantially two-leaves palm tree or T-shape on a narrow slit extended in the horizontal direction so as to mold a multiple rows of ribs each having a palm-tree or T-shaped section in the extruding direction on a thin plate-like substrate, thereby providing a primary molded product. Next, the rib of the primary molded product is cut in a predetermined thickness in the length direction successively and the palm tree shaped or T-shaped engaging elements are formed closely. Then, the substrate is expanded in the molding direction so as to separate respective engaging elements at a desired pitch, so that a molded surface fastener having a final configuration is produced.

Recently, a molded surface fastener having a hook type engaging element, whose shape is novel and never seen before and provided by changing a configuration of the conventional hook type engaging element largely, has been developed. Those molded surface fasteners have been disclosed in for example, Japanese Patent Application Laid-Open No. 9-322812 and Japanese Patent Application Laid-Open No. 11-56413. The engaging elements disclosed in these publications comprise an erected portion which is erected upward from the surface of the substrate, a neck portion which is separated in the molding direction with a V-shaped gap at a top end of the erected portion and an engaging head extended substantially horizontally back and forth in the molding direction from the neck portion. Further, a bottom face of the engaging head is inclined obliquely upward toward a front end thereof and a top face of the engaging head is flat. Additionally, a wing-like expanded portion having a thickness predetermined vertically is expanded each from the right and left side of the top face portion as viewed from the front in the molding direction.

As for the basic manufacturing method, primary molding technology using the aforementioned cylindrical drum is applied. However, the engaging element to be molded on the surface of the substrate at the time of molding is not molded in a J-shape from the beginning, but by molding a primary engaging element material having a substantially Y-shape having two V-shaped branch portions at a top end of the erected portion, as viewed from the side in the molding direction. Then, a preliminary molded product having a plurality of the primary engaging element materials on the substrate is produced. Consequently, the branched portion of said primary engaging element material of the primary molded product is heated with pressure so as to be deformed, so that the aforementioned engaging element having a peculiar configuration never seen before is molded.

On the other hand, the mushroom type molded surface fastener has been well known since before. According to, for example, U.S. Pat. No. 3,192,589, a primary molded product in which a plurality of column portions are erected on the surface of the substrate is molded. After that, a front end of the column portion of the molded product is soften by heating so as to mold a semi-spherical engaging head, thereby producing a molded surface fastener. Further, for example, Japanese Patent publication No. 8-508910 has disclosed an improved technology of the mushroom type molded surface fastener. In the molded surface fastener disclosed in this publication, a front end of the column portion of the primary molded product is softened by heating with pressure, so that a disc type engaging head is molded instead of the aforementioned semi-spherical engaging head.

Because the aforementioned mushroom type engaging element engages in all directions, it has been well known that it ensures a higher engaging strength and separation strength than the hook type engaging element whose engagement has a directivity. However, the mushroom type engaging element engages pile with its engaging head such that the pile winds around the neck portion of the engaging element, that is, the pile is hung from the neck portion. Therefore, there is a high possibility that the engaging element may be cut at the neck portion or the pile itself may be cut out when it is intended to release the pile from the engaging head. Thus, this type of engaging element often cannot bear repeated use and the engagement strength and separation strength are likely to be excessively increased.

The molded surface fastener disclosed in the aforementioned Japanese Patent publication No. 8-508910 is improved based on advantage and disadvantage of the mushroom type engaging element. The configuration of the engaging head is formed in a substantially disc-shape so as to intensify engagement ratio with minute pile and its separation strength is set appropriate. Consequently, this molded surface fastener can be applied as a fastener for the minute pile in various kinds of unwoven fabric, which is attached to the aforementioned disposable diaper and the like. As described above, application of such a fastener has been expanded rapidly and a further improvement has been proposed in for example, International Publication WO98/57565. In the improvement, it is intended to increase plasticity of the engaging head by forming a plurality of minute unevennesses on the top face of the disc-shaped engaging head.

On the other hand, the hook type engaging element is more likely to engage the pile as compared to the mushroom type engaging element and capable of securing appropriate engagement strength and separation strength easily. Further, upon separation, the engaging element or the pile is never cut out and it can bear repeated use. To use this kind of the engaging elements in the disposable diaper by employing such an advantage, for example, the aforementioned Japanese Patent Application Laid-Open No. 6-133808 has proposed a flat rectangular sheet-like piece of the engaging head. According to the Japanese Patent Application Laid-Open No. 9-322812, the engaging head is extended in two directions, back and forth in the molding direction so as to raise the engagement ratio. Further, the top face of the engaging head is formed substantially horizontal while a bottom face thereof is formed such that the vertical thickness is gradually decreased as it goes to the front end. Furthermore, the configuration of the engaging head is devised so that an expanded portion having a necessary thickness is expanded from a top face portion of the engaging head to a direction perpendicular to the molding direction.

However only if the dimension of the engaging element is reduced to increase the density or the configuration of the engaging element is changed to a simple one like the molded surface fastener disclosed in the Japanese Patent Application Laid-Open No. 6-133808, there is no warranty that the shearing strength and separation strength upon joining mating unwoven fabric are increased even when the engagement ratio with the minute pile such as the mating unwoven fabric, knitted fabric or the like is increased. Further, when the density of the engaging elements is increased extremely, when it is intended to make the hook-like engaging head invade into extremely flexible fiber pile wooded thickly on a mating unwoven fabric, the fiber pile disposed at random falls down by the engaging heads or the engaging heads themselves fall down, so that invasion of the engaging head into the fiber pile is disabled. Therefore, the engagement ratio drops as compared to the engagement ratio in an ordinary surface fastener. Thus, in the molded surface fastener having the minute engaging elements, there are limits in miniaturization of the configuration of the engaging element and the density thereof.

According to the manufacturing technology of the engaging element disclosed in the same publication, a multiplicity of ribs erected on a substrate of a primary molded product formed primarily are cut out successively at a predetermined pitch in the longitudinal direction and then, the substrate is extended in the longitudinal direction (molding direction) so that individual engaging elements are spaced at a predetermined interval. Therefore, the thickness in the molding direction of the engaging element is determined by the pitch of the cutting out and its stiffness is determined depending on material of used resin and cutting thickness. Therefore, when it is intended to obtain an engaging element which engages and disengages the minute pile such as a surface of unwoven fabric according to such manufacturing method for example, the thickness of the engaging element in the molding direction needs to be decreased, so that it is likely to be distorted in the molding direction. Thus, its stiffness cannot be improved unless the thickness is increased.

Additionally, in the molded surface fastener having the hook type engaging elements disclosed in the Japanese Patent Application Laid-Open No. 9-322812 or Japanese Patent Application Laid-Open No. 11-56413, although the aforementioned falling down of the erected portion is decreased due to the peculiar configuration of the engaging element and the engagement ratio is secured, a necessary separation strength is more difficult to obtain as the miniaturization is intensified. Thus, in particular, increase of the separation strength to the aforementioned disposable diaper and the like has been strongly demanded.

On the other hand, in the molded surface fastener having the mushroom type engaging elements disclosed in the Japanese Patent publication No. 8-508910 or the International Publication WO98/57565, a stem portion having an arbitrary diameter can be molded in order to prevent its bending and apply a required stiffness, although it is minute. However, when it is intended to provide the stem portion with a required stiffness, the diameter of the stem portion necessarily must be increased. When the diameter of the stem portion is increased, even if the extending length of the engaging head extended in all directions from the stem portion is set minute, the diameter of the engaging head is necessarily increased by such an increased amount of the stem portion. As a result, the engaging head cannot engage such minute loops easily.

In any one of the engaging elements disclosed in the above-described publications, it is impossible to exclude a configuration and function peculiar to the mushroom type engaging element. That is, in any engaging element, the engaging head is extended in all directions around the stem portion, so that the pile is always wound around the neck portion upon the engagement or the neck portion is always hung by the pile. The separation strength by the engaging element itself is too high even if any improvement is made, so that the separation strength cannot be reduced to strength appropriate for a fastener of, for example, the disposable diaper. Further, it is difficult to avoid cutting of the pile.

As for a problem of this kind of the conventional integral molded surface fastener, when it is intended to use the fastener as a fastener in a disposable diaper, medical simple clothes, napkins, various kinds of working simple clothes, underwear and the like, it must cope with extremely minute pile exposed on the surface of, for example, ordinary unwoven fabric or knitted fabric as a counterpart for the engagement. Thus, each engaging element of the integral molded surface fastener must be formed in minute dimension and particularly, because the engaging elements are likely to come into contact with the mild skin of baby, they need to be plastic enough and mild in its texture to the skin. Further, this kind of fastener needs to bear repeated use of at least two or three times sufficiently even if it is disposable and at the same time, an appropriate separation strength not allowing the diaper to slip out easily is demanded.

However, although its engaging elements can be miniaturized in the conventional integral molded surface fastener, the engaging element such as the mushroom type engaging element still ensures a too strong separation strength, so that the minute pile and the engaging element itself are likely to be damaged upon separation. As for the hook type engaging element, although the minute pile and the engaging element itself are never damaged, currently, a required separation strength has not been secured.

SUMMARY OF THE INVENTION

The present invention has been achieved to solve those various problems and therefore, an object of the invention is to provide an integral molded surface fastener having minute and peculiar engaging elements, which engage fine and thickly wooded fiber pile securely while each engaging element secures an appropriate engaging strength, shearing strength and separation strength, wherein texture of a surface of the surface fastener is improved and the height of the engaging elements protruded from a surface of the substrate may be set lower than a conventional one, thereby preventing the engaging elements from falling down by a pressing force. At the same time, the engaging element of the invention secures a high engaging ratio with a mating pile piece and satisfies a durability required for this kind of fastener, and preferably, secures a desired plasticity and tearing strength of a flat substrate.

To achieve the above object, there is provided an integral molded surface fastener of synthetic resin having a plurality of fine engaging elements molded integrally on the surface of the flat substrate for engaging/disengaging mating pile pieces, wherein each of the engaging elements comprises a single column portion having a substantially cross-shaped section constituted of a first column portion and a second column portion each having a necessary height and a necessary width in an intersecting direction parallel to the surface of the substrate and substantially rectangular thin plate-like engaging heads formed in a top end portion of the column portion, having substantially the same width as the width of the top end of the second column portion, and being parallel to the surface of the flat substrate and extended in opposite directions along the width direction of the first column portion.

The substantially rectangular thin plate-like configuration mentioned in this specification includes not only complete rectangles but also configurations whose ends in a long side direction are extended outwardly and in which width of the long side is slightly changed.

Because according to the invention, the section of the column portion of the engaging element forms a substantially cross shape, stiffness in the width directions extending with cross-shape of the first and second column portions intersecting each other, that is, stiffness in four directions, is increased. Thus, difficulty of being bent of the column portion of the invention is not inferior to those of the column portions having a section of a square whose side has the same dimension as the width of the first or second column portion, or a section of a circle whose diameter has the same dimension as the width. That is, it means that the invention can secure a required stiffness more easily although the amount of material used is smaller if the same material is employed.

However, when the column portion is composed of a mere rectangular column portion, when it is pressed from above in order to engage it with a mating pile or it is intended to remove the engaged pile, the column portion is likely to fall down at its root. Thus, preferably, the width of at least any one of the first and second column portions is decreased gradually toward the engaging head, that is, the width dimension of the column portion near a proximal end thereof is increased so as to increase stiffness of that portion, thereby making it difficult for the column to fall down.

On the other hand, according to the invention, the engaging heads formed at the top end of the column portion, that is, the rectangular thin plate-like engaging heads each having the same width dimension as the width dimension of the top end of the second column portion is extended from the column portion as a center portion in the form of wing in the width direction of the plate of the first column portion, each engaging head having substantially the same dimension. In other words, in the engaging element of the invention, the center portion of a mule-like thin plate portion having the same width as the top end of the second column portion is supported by the top end of the column portion erected such that the first and second column portions intersects each other in the shape of a cross. The engaging element has a pair of the engaging heads extended in opposite directions from the top end of the first column portion substantially horizontally. This engaging element belongs to a modified type of the above-described hook type engaging element.

The vertical thickness of the engaging head may be determined arbitrarily according to the latter mentioned manufacturing method of the invention. However, it may be changed by the width dimension of the head, that is, the width dimension of the top end of the second column portion, or the size or configuration of the pile on the surface of the unwoven fabric, which is an engagement mate. Meanwhile, the height of the pile protruded from the surface of unwoven fabric or knitted fabric for use in a pile engaging portion of the disposable paper diaper and the like is as fine as about 0.35 to 1.1 mm.

Therefore, when the engaging head is formed with a small width dimension while the thickness thereof is as small as possible, the engaging head is allowed to invade into the above-described minute pile. However, when the thickness of the engaging head is too small while the width dimension thereof is also too small, a required engaging strength or separation strength cannot be secured. For the reason, it is very important that the thickness and the width dimension can be controlled arbitrarily.

However, in some case, no sufficient effect can be obtained only if the thickness or the width dimension is changed. Thus preferably, a bottom face of the engaging head is composed of a tapered face whose thickness is decreased gradually from the first column portion toward a front end of the engaging head. By applying such a structure, the vertical thickness of the front end of the engaging head is set smaller than that of the proximal end portion thereof. Thus, not only the engaging head can invade into the mating pile more easily but also if the pile engages, the engaging strength and separation strength are increased because the thickness near the proximal end portion is large. Meanwhile, as for the engagement aspect between the engaging head and the pile of the invention, the pile is entangled with a pair of the engaging heads at the same time so that it is hooked on the column portion of the engaging head.

Preferably, a top face of the engaging head is substantially flat. Because the top face of the engaging head is formed substantially flat, there is no prickly feeling peculiar to an engagement face of the molded surface fastener, so that an extremely smooth surface can be obtained thereby eliminating a danger of damaging the user's skin.

Further preferably, the center portion of the top face of the engaging head in the longitudinal direction is formed such that it is slightly recessed with respect to the other top face portion. This recess makes it easy for the engaging head to be bent on the border between the recess and the engaging head extended from the first column portion, when it is intended to release the engaged pile from the engaging head. As a result, even if the thickness of the proximal end portion of the engaging head is large, the pile can be released from the engaging head easily. Consequently, necessary separation strength can be obtained.

Preferably, a further aspect of the configuration of the engaging head is specified and that is, each front end of the engaging head is curved downward. Although the basic configuration of the engaging head is of thin plate, the front end of the engaging head is curved downward according to this aspect. This curved portion allows the pile once engaged to be hooked on that curved portion, thereby increasing the engagement strength and separation strength.

Further preferably, the substrate is not composed of a mere flat plate, but a concave portion is further provided between adjacent column portions in a molding direction of the substrate.

Thus, when the engaging element is raised upward from the bottom face of the concave portion, even if a distance between a rear face of the front end of the engaging head and a starting end of the column portion (bottom face of the concave portion) is set as usual, the distance between the bottom end of the front end of the engaging head and the surface of the substrate other than the concave portion becomes equal to a difference between an actual height of the column portion from the proximal end thereof and the depth of the concave portion. Thus, although the actual height of the engaging element erected from the substrate is of the same dimension as conventionally, an apparent height protruded from the surface of the substrate is of the dimension that the actual height of the engaging element minus the depth of the bottom face of the concave portion.

If the concave portion is formed in the surface of the substrate, plasticity of the substrate is improved remarkably even if the apparent thickness is the same as conventionally. Further, regarding the molding thereof, when the surface fastener is peeled off from the molding die after the surface fastener is molded, it can be separated stably such that the substrate is not stretched unreasonably or torn out.

As a result, there is no waving in the substrate of a molded product, so that a high quality product capable of bearing actual use sufficiently can be obtained. If the height of the column portion from the bottom face of the concave portion is set substantially 1/5 to 4/5 of the height from the bottom face to the top of the front end of the engaging head, a portion of the column portion protruded from the surface other than the concave portion of the substrate is relatively lower. Thus, the column portion is more unlikely to fall down, thereby stabilizing the configuration upon engagement. Further, when the concave portion has such a width allowing a mating pile to be introduced therein, engagement ratio with the pile is increased.

As for a preferred dimension of the engaging element of the invention, particularly, a distance between the top of the front end of the engaging head and the surface of the substrate is 0.1 to 1.2 mm, the extending length of the engaging head from the column portion is 0.2 to 0.5 mm and the height of the column portion from the surface of the substrate is 0.005 to 1.0 mm. These numeric ranges are basic numeric ranges sufficient for securing the engagement with the pile piece (pile) having a minute configuration, which is an engagement object of the invention and further, the ranges produce no strict feeling upon engagement or disengagement. Particularly, their minimum values allow secure engagement with a fiber pile having the finest configuration in ordinary unwoven fabric.

Preferably, each dimension and density of the engaging element are specified. The maximum thickness in the vertical direction of the engaging head requires not so high stiffness if considering engagement strength or separation strength in case where the fastener is employed for the disposable diaper or the like, but the thickness of 0.2 to 1.1 mm is sufficient. More preferably, the front end of the engaging head is narrowed gradually as viewed from above, so that it becomes more likely to invade into the mating pile.

Further preferably, the dimension between ends in the extending direction of the engaging head is 0.4 to 1.2 mm while the maximum width thereof in a direction perpendicular to the extending direction from the first column portion is 0.2 to 1.2 mm. Alternately, the extending length of the engaging head from the first column portion is 0.08 to 0.5 mm. Further alternately, the height from the surface of the substrate to a top face of the engaging head of the engaging element is 0.1 to 1.2 mm.

If the total area of the top face of the engaging element is set to 20 to 50% of the surface area of the substrate, preferably, to 25 to 40%, not only the desired engagement ratio with the mating pile is secured, but also a prickly feeling, which may be generated when the engaging head of the surface fastener is touched, is eliminated. When a continuous molded surface fastener having the above described configuration is mounted on the paper diaper or the like through continuous process, the long molded surface fastener transferred continuously is cut out to a desired length in succession. This cut piece is rotated and moved by a suction roll having a fixed sucking portion provided on part of an inner wall face of its peripheral face with a rotation of the roll, such that the erected face of the engaging element is sucked. Then, the cut piece is carried to a predetermined position of the paper diaper carried through a transportation path disposed perpendicular to the rotation direction of the cut piece and mounted to the paper diaper successively. Therefore, the cut pieces need to be sucked and carried effectively and securely on the peripheral face of the suction roll. When the total area of a flat surface with respect to the surface area of the substrate is set up as described above, the suction to the suction roll is achieved securely.

Preferably, the arrangement of the engaging elements having such structure on the substrate is specified.

The first column portion is disposed perpendicular to the molding direction of the substrate while the second column portion is disposed parallel to the molding direction of the substrate. Alternately, the first column portion may be disposed parallel to the molding direction of the substrate while the second column portion may be disposed perpendicular to the molding direction of the substrate. To direct the engaging heads in two different directions, that is, the molding direction and a direction perpendicular thereto, it is preferable to turn the cavity portion composed of the long hole portion by 90°.

As a result, a case where engaging elements whose first and second column portions are formed in the both directions proposed above are mixed is specified. That is, engaging elements whose engaging heads are extended in the molding direction of the substrate and engaging elements whose engaging heads are extended in a direction perpendicular to the molding direction of the substrate exist mixedly. Because the engaging elements directed to the two directions, that is, the molding direction and the direction perpendicular thereto, exist mixedly, the engagement ratio with the mating piles is improved. The way of the arrangement may be determined arbitrarily, so those engaging elements may be disposed on the surface alternately in the form of matrix of the substrate or in a staggered way.

According to the invention, there is provided a manufacturing method for the aforementioned integral molded surface fastener having hook type engaging elements, comprising the steps of rotating in a single direction a cylindrical drum having a plurality of cavities for molding preliminary engaging elements each comprised of a cross-shaped section hole portion which is open in the shape of a cross on its peripheral face and extended up to a predetermined depth and a long hole portion extended in the molding direction or in a direction perpendicular to the molding direction, which is formed subsequently to the cross-shaped section hole portion and has a deep portion branched to two sections, molding preliminarily-molded elements each which is erected integrally with the rear face of the substrate and comprised of a preliminarily-molded column portion extended from a proximal end portion to an intermediate portion and having a cross-shaped section and a preliminarily-molded head extended from the preliminarily-molded column portion to a top end and having an elongated section with the top end portion branched to two sections by filling part of molten resin into the cavities at the same time of injecting of the molten resin toward the peripheral face of the cylindrical drum continuously and molding the substrate along its peripheral face, separating continuously a belt-like preliminarily-molded product having the preliminarily-molded element on the substrate transferred by the peripheral face of the rotating cylindrical drum from the peripheral face of the cylindrical drum, transferring the separated preliminarily-molded product continuously to a heating pressure portion, and deforming the preliminarily-molded head of the preliminarily-molded element erected integrally from the surface of the substrate of the transferred preliminarily-molded product to a flat rectangular thin plate by heating with pressure and melting by means of the heating pressure portion so as to mold the engaging heads at the top end of the column portion continuously.

The most characteristic structure proposed in the method of invention is the configuration of the cavity formed in the peripheral face of the cylindrical drum and the configuration of the preliminarily-molded element for the engaging element formed by the cavity. According to the configuration of this preliminarily-molded element, the preliminarily-molded material erected with a mere equal section from the rear face of the substrate is not molded unlike the conventional mushroom type, but this preliminarily-molded element is comprised of a preliminarily-molded column portion having a cross-shaped section at a substantially half portion on the side of a proximal end of the preliminarily-molded element and a preliminarily-molded head, in which a half portion on the side of the top end portion continuous to this preliminarily-molded column portion has a substantially uniform and elongated section while the top end portion is branched to two sections in the form of a substantially U.

This preliminarily-molded element is deformed by heating the top end thereof with a pressure, so that the engaging element having the aforementioned peculiar shape of the invention is molded. The preliminarily-molded column portion turns to the first and second column portions of the engaging element and the preliminarily-molded head of the top half portion is deformed with melting to a substantially rectangular thin plate extended in the width direction so as to mold the engaging head. The extending amount and thickness of this engaging head are determined depending on the amount of resin used for the preliminarily-molded head and the amount of deformation with melting by pressure upon heating with pressure. Therefore, by controlling the amount of resin of that deformed portion and the amount of the deformation by heating with pressure, the thickness and extending length of the engaging head can be controlled. Further, by selecting the width direction of the first column portion to be the molding direction and/or a direction perpendicular thereto, the direction of the engaging head can be changed arbitrarily as proposed above.

When the top end portion of the preliminarily-molded head is molded in the form of a substantially U, in case that a column portion has such a mere elongated section, the dimension of the center portion of the engaging head intersecting the width direction of the column portion is enlarged upon deforming the engaging head by heating with pressure subsequently, so that it approaches the shape of the mushroom type engaging element which is entirely elliptic and extended in all directions from the column portion. As a result, engagement with the pile has directivity in all directions thereby making it difficult to control the engagement strength and separation strength. Consequently, as disclosed in the above-described Japanese Patent publication No. 8-508910, the fine piles and engaging elements are likely to be damaged and the separation strength is likely to be increased, so that such a shape of the mushroom type engaging element is not preferable. Therefore, molding the top end portion of the preliminarily-molded head in the form of a substantially U is very important for forming the hook type engaging head in order to avoid the above problems.

According to the invention, there is provided a continuous manufacturing apparatus for the integral molded surface fastener comprising a cylindrical drum rotating in a single direction and having a plurality of cavities for molding the preliminary-molded engaging elements each comprised of a cross-shaped section hole portion which is open in the shape of a cross on a peripheral face and extended up to a predetermined depth and a long hole portion elongated in the molding direction or in a perpendicular direction of the molding direction, which is formed subsequent to the cross-shaped section hole portion and has a deep portion thereof being branched to two sections, a continuous injecting device for molding the substrate along the peripheral face of the cylindrical drum by injecting molten resin toward the peripheral face continuously and filling the cavity with part of the molten resin so as to mold preliminarily-molded elements each which is erected integrally from the rear face of the substrate and comprised of a preliminarily-molded column portion extended from a proximal end portion to an intermediate portion and having a cross-shaped section and a preliminarily-molded head extended from the cross-shaped section portion to a top end and having an elongated section with the top end portion branched to two sections, take-up means for continuously separating a belt-like preliminarily-molded product having the preliminarily-molded element on the substrate transferred by the peripheral face of the rotating cylindrical drum from the peripheral face of the cylindrical drum and a heating pressure portion for deforming with melting the preliminarily-molded head of the preliminarily-molded element erected integrally from the substrate surface of the separated preliminarily-molded product to a flat rectangular thin plate by heating with pressure so as to mold the engaging heads continuously.

By disposing the continuous injection device, the cylindrical drum, the take-up means and the heating pressure portion described above, continuously, the molded surface fastener of the invention, in which a plurality of the engaging elements each having the above-described configuration are formed integrally on a continuous substrate can be manufactured effectively and continuously.

Preferably, the heating pressure portion comprises a mounting/transferring face for the preliminarily-molded product and a heating pressure roll having a shaft included in an upper plane parallel to and above the mounting/transferring face and extended in a direction perpendicular to the transferring direction of the preliminarily-molded product, a gap between a lower end position of the heating pressure roll and the mounting/transferring face being smaller than a sum of total dimension in the vertical direction of the substrate and the column portion and a dimension in the vertical direction of the engaging head. Alternately, the heating pressure portion comprises the a heating member, which is disposed above the mounting/transferring face and has an inclined face in which a gap between its lower face and the mounting/transferring face is decreased gradually instead of the heating pressure roll, and the minimum gap between the mounting/transferring face and the inclined face is smaller than a sum of the dimensions in the vertical direction of the substrate and column portion of the primary molded member and the dimension in the vertical direction of the engaging head.

**When the minimum gap between the pressing face of the heating pressure portion and the surface of the substrate is set up as described above, the engaging head having the aforementioned configuration can be formed only by introducing the preliminarily-molded product formed on the rotating drum into the heating pressure portion and passing by. Here, the minimum gap between the pressing face of the heating pressure portion and the surface of the substrate is set up to be the thickness of the engaging head, which has been preliminarily set up, when the preliminarily-molded head is deformed under a pressure. When the gap is slightly large, the portion corresponding to the elongated portion on the border region between the preliminarily-molded head and the preliminarily-molded column portion is not deformed so that it is left as a neck portion having the elongated section parallel to the width direction of the first column portion.

It is needless to say that a case where such a neck portion is formed is included in the technical scope of the present invention. When the mating pile engages the engaging head such that it winds around its neck portion if a neck portion having the elongated section in the extending direction of the engaging head is formed, when it is intended to remove that pile, the neck portion swings so as to incline the pile in the separation direction, thereby facilitating removal of the pile as compared to the case of non-existence of the neck portion and preventing the pile from being cut out unreasonably.

When the heating temperature of the heating pressure portion is adjusted near a melting point of material resin or the heating time with pressure of the preliminarily-molded product is prolonged, softening of the extending end of the engaging head is accelerated, so that it is curved downward and drooped due to its own weight and engagement force with the mating one is increased.

Upon molding the preliminarily-molded product according to the manufacturing method of the molded surface fastener of the present invention, cooling means is incorporated in, for example, a cylindrical drum and the preliminarily-molded product accompanying region of the cylindrical drum is dipped into the cooling bath and cooled positively. Preferably, the molded surface fastener passing the heating pressure means is not cooled positively by any special cooling means but cooled gradually in the ambient temperature and wound up as a final product. By cooling the engaging head deformed by heat gradually so that it hardens, crystallization of the same heated portion is accelerated so that stiffness of the engaging head is increased as compared to the column portion. At this time, a heating region, heating time and heating temperature can be controlled appropriately depending on the dimension and modification of the engaging element.

In the integral molded surface fastener in which the substrate and the preliminarily-molded elements are cooled and hardened rapidly without acceleration of crystallization, the substrate and column portion hold plasticity and the stiffness of the engaging head is increased. Thus, even in case of the molded surface fastener composed of minute engaging elements and having a high plasticity, the stiffness of the engaging head is secured so as to improve bending strength. Consequently, a molded surface fastener of the present invention, which has a predetermined engagement strength and separation strength as well as a resistance in the shearing direction, is obtained.

DESCRIPTION OF THE PREFERRED EMBODIMENTS

Figure 1:
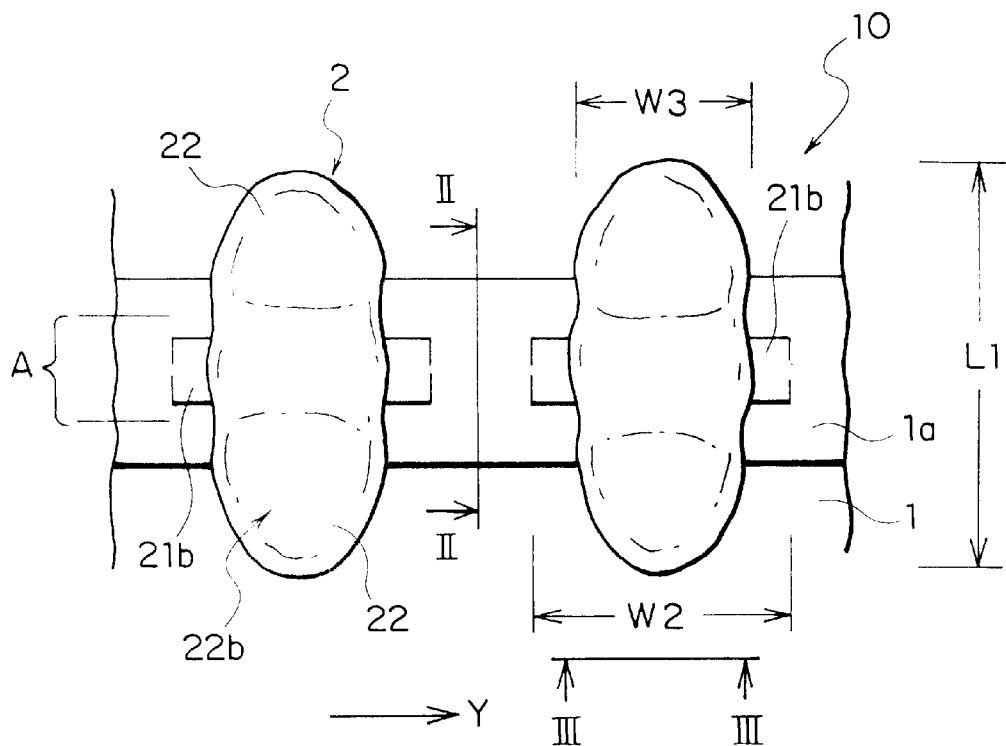
FIG. 1 is a partial plan view showing a first structure example of a molded surface fastener according to the present invention.
Figure 2:
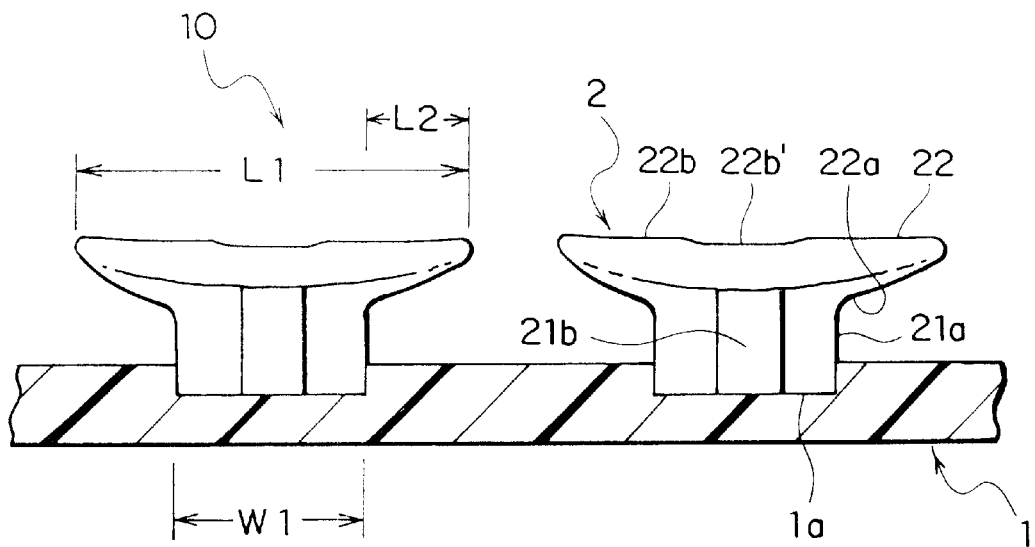
FIG. 2 is a sectional view taken along the line II—II of FIG. 1.

Hereinafter, the preferred embodiments of the present invention will be described in detail with reference to the accompanying drawings. FIG. 1 is a partial plan view of a molded surface fastener of a first embodiment having typical engaging elements of the present invention. FIG. 2 is a sectional view taken along the line II—II of FIG. 1, FIG. 3 is a sectional view taken along the line III—III and FIG. 4 is a perspective view of part of the molded surface fastener as viewed obliquely from above.

According to this embodiment, a dented groove 1a, which is extended linearly in the molding direction, is formed in the engaging element molding face of a flat substrate 1 and each engaging element 2 is raised from the dented groove 1a. The flat substrate 1 of the present invention may have engaging elements which are raised directly from the flat surface without molding the dented groove 1a as described above.

Figure 3:
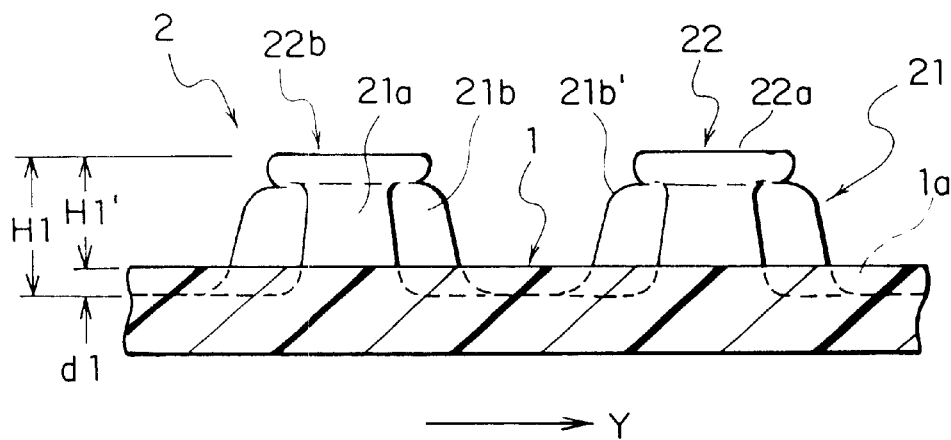
FIG. 3 is a sectional view taken along the line III—III of FIG. 1.
Figure 4:
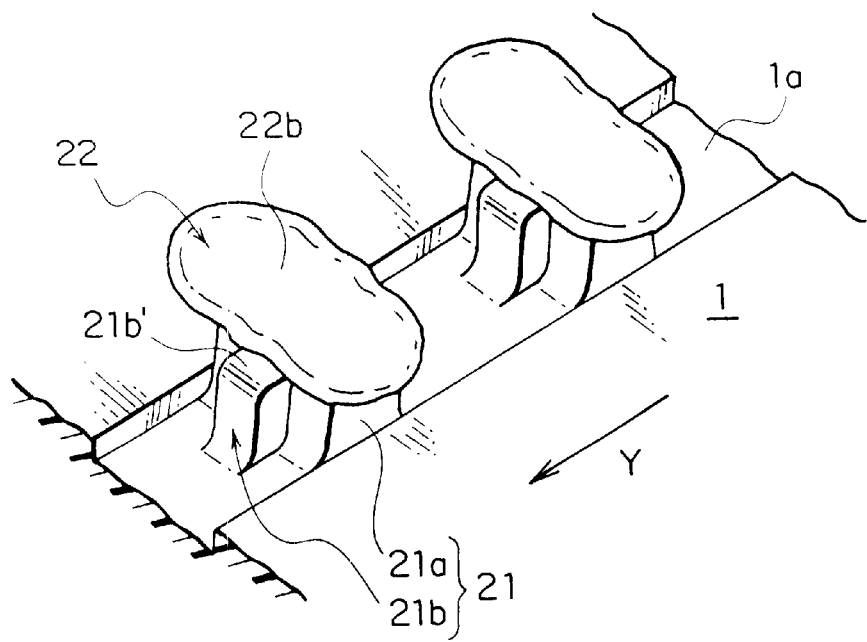
FIG. 4 is a perspective view showing an expanded part of the same molded surface fastener.

As shown in FIGS. 1 to 3, a pair of substantially rectangular thin plate-like engaging heads 22 are extended from a top end of a column portion 21 raised vertically from the surface of the flat substrate 1 such that they are directed opposite to the molding direction while each of the engaging heads 22 is extended in the shape of a wing in an opposite direction. According to this embodiment, the column portion 21 comprises a first column portion 21a and a second column portion 21b, which intersect each other along the raising direction of the column so that all the section from a proximal end to a top end is in a substantially cross shape. According to this embodiment, the width direction in the intersecting direction of the first column portion 21a is set up substantially equal to the width W1 of the dented groove 1a on top and bottom. The width W2 in the intersecting direction of the second column portion 21b is raised so that its bottom end is curved largely in the length direction of the dented groove 1a while it is decreased gradually from its intermediate portion to the top end.

By forming the section of the column portion 21 in a cross shape, stiffness of the molded surface fastener 10 in the molding direction and a direction perpendicular to the same molding direction is increased, so that the column portion 21 is not likely to fall down when a pressure is applied to engage the surface fastener 10 or engagement of the engaging elements 22 is released. Because the width of each of the column portions 21a, 21b is increased gradually from the top end to the proximal end in the length direction, it is possible to avoid buckling of the proximal end portion and fall-down of the engaging elements as compared to a case where the columns have the same dimension from the top end to the proximal end, so that upon engagement, the engaging head 22 can invade into a mating pile effectively thereby increasing the engagement ratio largely.

As described above, in the column portion 21 of this embodiment, the first column portion 21a of this embodiment has substantially uniform width W1 in the intersecting direction while the width W2 of the second column portion 21b in the molding direction is decreased gradually from the proximal end portion to the top end portion. The thickness in the vertical direction of the aforementioned substrate 1 is 0.40 mm and the width W1 in a direction intersecting the molding direction of the first column portion 21a of the column portion 21 is 0.46 mm and the width W2 in the molding direction of the second column portion 21b is 0.68 at its proximal end and 0.48 at its top end portion.

As shown in FIGS. 1 and 2, the configuration of a pair of the engaging heads 22 extended substantially horizontally in the back/forth direction perpendicular to the molding direction from the top end of the column portion 21 has a substantially flat top face. The top end portion of the column portion 21 is thick and a bottom face of the head has a slope inclined upward from its center to its periphery thereby providing a wedge-shaped cross section. The engaging head 22 entirely provides a substantially rectangular shape whose edge in the extending direction is circular as shown in FIG. 1. Further, the width W3 in the molding direction of the engaging head 22 is substantially equal to the width in the intersecting direction of the second column portion 21b at the top end portion.

Such a thin-plate structure allows the engaging head to engage a pile, which is a mating engaging element, easily. Further, because, as a rule, the central portion of the engaging head 22 is supported in a cross shape by means of the first column portion 21a and the second column portion 21b as described above, the engaging head is never likely to be bent easily in the midway of the extension, so that appropriate stiffness is given. Further, because thickness in the vertical direction is decreased gradually from the first column portion 21a to the front end, this engaging head can invades into a low pile easily so as to heighten the engaging ratio with the pile more largely as compared to a mere flat type engaging element.

Further, according to this embodiment, the configuration of the engaging head viewed from above is hook type composed of two leaves each similar to the shape of a slipper while the dimension L1 in the extending direction of each engaging head 22 is hardly changed from the proximal end portion to its front end. Thus, the engaging ratio with the pile can be improved further due to a structure allowing the engaging head to engage a minute pile easily as well. Meanwhile, because crystallization of the engaging head 22 is intensified more than the column portion 21 due to the forming method of the engaging element 2 of the present invention described later, stiffness of material is also increased.

The extending length of the engaging head 22 extended in an opposite direction along the intersecting direction with the second column portion 21b of the first column portion 21a of this embodiment is 0.26 mm, the thickness in the vertical direction of the extension proximal end of the engaging head 2 is 0.14 mm, the maximum dimension W3 in the molding direction is 0.44 mm and the dimension L1 between the front ends of the engaging head 22 in a direction intersecting the molding direction is 1.03 mm. The shape of a top face thereof is not a mere rectangle but is a configuration produced by combining a region A representing an elongated-circular dish shape at a portion corresponding to the column portion 21 with a short diameter portion of another substantially elongated-circular dish shape on each of both sides across the long diameter ends of the elongated-circular dish shape. According to the present invention, the entire configuration including these shapes is called substantially rectangular. Then, a top face 22b' in the region A in the center is slightly dented with respect to the other top face 22b.

The feature of the present invention is that the central region 22b' of the top face in the extending direction of the engaging head 22 is formed slightly dented as compared to the other top face 22b. This recess facilitates bending of the extended portion on the border between the recess and the engaging head 22 extended from the first column portion 21a when it is intended to release a pile engaging the engaging element 2. For example, if the thickness in the vertical direction at the proximal end of the engaging head 22 is large, the pile can be removed from the engaging head 22 easily and further, a necessary separation strength can be obtained.

Due to the structure in which the top end portion of the column portion 21 is integrated with the engaging head 22, even if the thickness in the vertical direction at the proximal end of the engaging head 22 is increased, the engaging head 22 is likely to be bent on the border with the circular dish-like recess. Consequently, the pile engaging the engaging head 22 is easy to remove under an appropriate stiffness or with appropriate engaging strength and separation strength.

According to this embodiment, as shown in FIGS. 1 and 2, the straight dented groove 1a, which connects the adjacent engaging elements 2 in the molding direction, is formed in the surface portion of the flat substrate 1 on which the engaging elements are formed. As shown in FIG. 2, the width W1 of this straight dented groove 1a is equal to the width of the first column portion 21a and the proximal end portion of the second column portion 21b is extended in the groove direction in the center in the width direction of the dented groove 1a. The side wall of the dented groove 1a is integrated with an end face of the first column portion 21a and as a result, the dented groove 1a is formed between the respective column portions 21 arranged in line. According to this indicated example, a string of the engaging elements is formed in a straight line along the molding direction and then, a number of the strings of the engaging elements are formed in parallel. The dented groove 1a is not restricted to the above described configuration but the dented grooves 1a in the direction of the engaging element string may be completely independent of each other. Further, the dented grooves 1a may be disposed in staggered manner in the surface of the substrate 1.

If the dented groove 1a is formed in the surface of the substrate 1, not only plasticity of the substrate 1 is improved remarkably even if an apparent thickness of the substrate 1 is equal to that of the conventional one, but also when its preliminarily molded product is separated from a molding die after the molding is finished, the substrate 1 is never extended unreasonably or torn, so that it can be removed in a stabilized condition. As a result, in the preliminarily molded product after the molding, its substrate 1 is never waved and consequently, a completed surface fastener turns out to be a high quality product capable of bearing practical use sufficiently.

If the dented groove 1a is formed in the surface of the substrate, with respect to a distance H1 between a top face of the engaging head 22 and a starting end (bottom face of the dented groove 1a) of the column portion 21, a distance H1' between the apex of the front end of the engaging head 22 and the surface of the substrate 1a excluding the dented groove 1a is equal to a difference between the actual height H1 of the engaging element 2 erected on the substrate 1 and the depth d1 of the dented groove 1a as shown in FIG. 3. Although the actual height H1 of the engaging element 2 erected on the substrate 1 is equal to that of the conventional one, the apparent height H1' protruded from the surface of the substrate is a dimension obtained by subtracting the depth d1 of the bottom face of the dented groove 1a from the actual height H1.

Therefore, the actual height H1 of the column portion 21 is equal to that of the conventional engaging element, the apparent height H1' is shorter so that the engaging element is unlikely to fall down at the time of engaging or separation. When the engaging element 2 of the surface fastener 10 of this embodiment having such a structure is engaged with a mating pile (not shown), a front end of the pile is introduced by the dented groove 1a so that it comes below the engaging head 22. Then, it is introduced to the proximal end portion of the column portion 21 of the engaging element 2, so that the engaging head 22 is inserted smoothly into the pile. Thus, ease of engagement with the pile is not different from a conventional engaging element which is raised from the surface of a flat substrate.

Because according to the above-described embodiment, the entire engaging head 22 including the top end portion of the column portion 21 is so structured with higher stiffness than the conventional flat substrate 1 and column portion 21 and easy to bend upon separation, the configuration of the engaging element 2 is stabilized and its holding force for the mating pile is increased. At the same time, an appropriate force is possessed upon separation. The dimensions of respective parts of the above-described engaging element 2 indicate only just the most preferable example, those values may be changed in various way within a technical scope of the present invention under the relationship with the mating pile and it is needless to say that they are not restricted to the above-described values.

The substantially rectangular thin plate-shaped engaging head 22 produces various valuable functions which cannot be expected to the conventional simple turned-down J-shaped, L-shaped and T-shaped engaging elements.

First one of the achieved functions is that the top face 22b of the engaging head 22 can be turned to a substantially flat plane as described above, thereby exerting a function for improving prickly texture of the top face 22b. Second one is that such a peculiar configuration of the column portion 21 can secure substantially the same stiffness with a smaller amount of resin than that used for the conventional column portion.

The third function is that when the mating pile engages the engaging head 2, it is curved into the shape of a hook such that it is wound around a top end portion of the column portion 21, unlike the function of the conventional hook-type engaging head which has substantially uniform thickness and only hooks. Consequently, the mating pile cannot be removed easily from the engaging head 22, so that the engaging force of the engaging head 22 is increased largely.

In the engaging head 22 extended only in opposite directions from the column portion 21, different from the conventional mushroom type engaging element having an umbrella type engaging head extended in all directions from the column portion, the engaging head has two leaves extended in opposite directions. Thus, even if the pile hooks the engaging head 22 such that it is wound around the top end portion of each column portion 21 extended downward substantially linearly from the bottom face of the proximal end from which a pair of those leaves are extended, the same engaging head 22 is deformed and raised elastically through the top end of the column portion 21 and at the same time, the pile goes along the periphery of the oval shaped engaging head 22 while receiving slight friction resistance smoothly, and consequently, it slips out easily.

Thus, the engaging element 2 of this embodiment ensures a sufficiently larger separation force than the conventional simple hook-type engaging head and less damage does not occur in the engaging element 2 and the pile as compared to the mushroom type engaging head. Further, a predetermined engaging force is secured despite its minute dimension.

Although according to the above-described embodiment, engaging elements 2 of the same row and engaging elements 2 of an adjacent row are disposed side by side, the engaging elements 2 of adjacent rows may be disposed in a staggered manner. In this case, breaking in a direction perpendicular to the row of the engaging elements on the flat substrate 1 is prevented securely.

Figure 5:
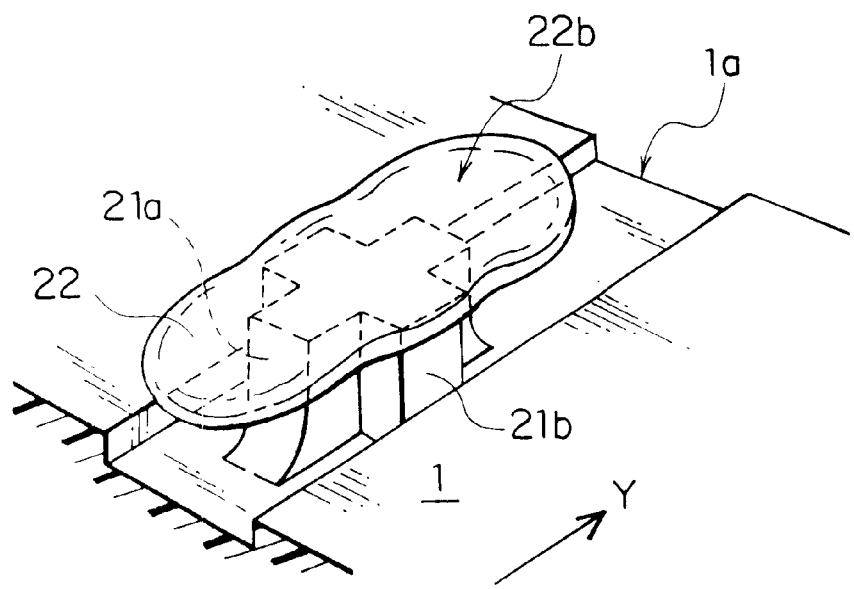
FIG. 5 is a partial perspective view showing a second structure example of the molded surface fastener.
Figure 6:
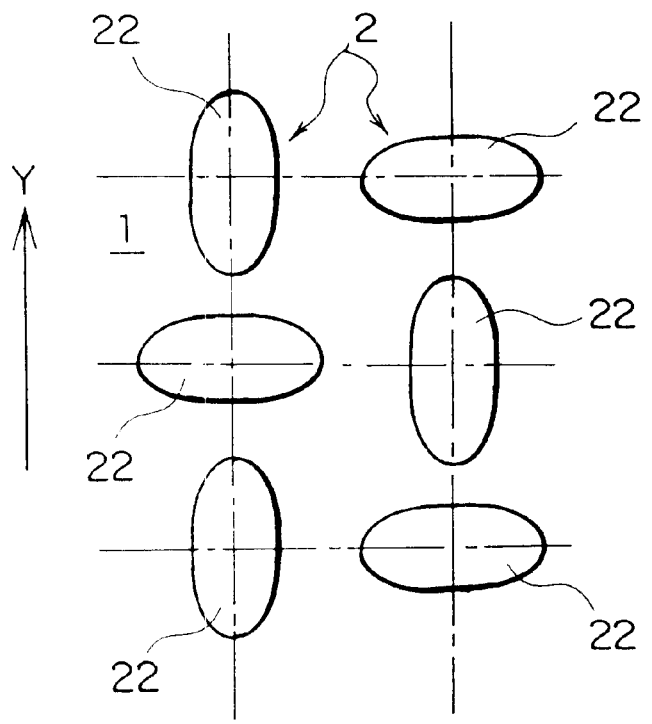
FIG. 6 is a partial plan view schematically showing an example of arrangement of the engaging elements of the same molded surface fastener.
Figure 7:
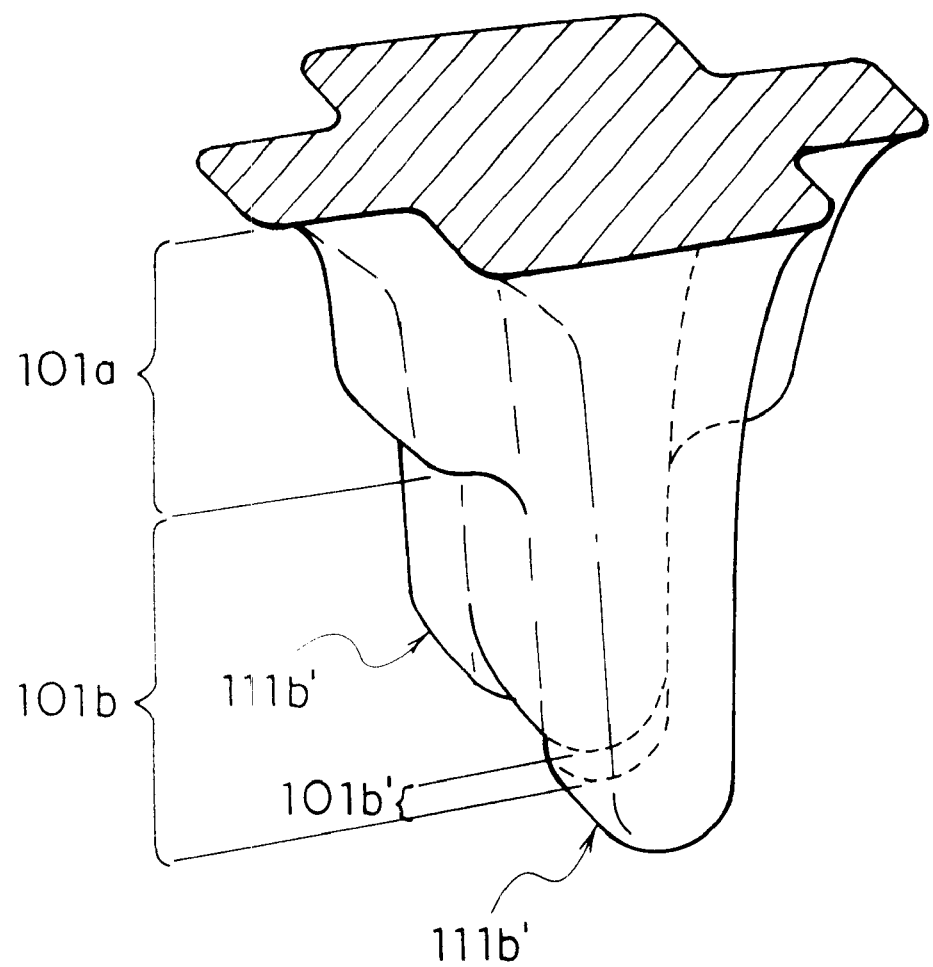
FIG. 7 is a perspective view showing the configuration of a preliminary element molding cavity for the same engaging element.

Although according to the above-described embodiment, the extending directions of the engaging head 22 extended from the column portion 21 of each of the engaging elements 2 arranged in the molding direction are all perpendicular to that molding direction, the extending direction thereof may be parallel to the molding direction as shown in FIG. 5. In this case, the first column portion 21a having a desired width W1 is disposed in a direction perpendicular to the molding direction such that the direction of the width W1 is equal to the molding direction, while the second column portion 21b having a predetermined width W2 is disposed in the molding direction such that the direction of that width W2 is perpendicular to the molding direction. That is, in this case, the first and second column portions 21a and 21b are disposed inversely to the example described previously As a result, as shown in FIG. 5, it is permissible to dispose engaging elements 2 whose engaging heads 22 are extended perpendicularly to the molding direction and engaging elements 2 whose engaging heads 22 are extended parallel to the molding direction alternately. As for entire arrangement, as shown in FIG. 6, for example, it is permissible to dispose engaging elements 2 whose engaging heads are extended in an equal direction in a staggered manner and then, dispose engaging elements 2 whose engaging heads 22 are extended perpendicularly to the former extending direction between the former engaging elements.

The integral molded surface fastener 10 of the present invention having such a structure can be produced easily and continuously by changing part of the structure of an apparatus disclosed in the above-described Japanese Patent Application Laid-Open No. 11-56413.

FIG. 8 shows schematically a preferred embodiment of a continuous manufacturing apparatus of the integral molded surface fastener and its manufacturing process of the present invention.

Reference numeral 111 in the same Figure denotes an injection nozzle of a continuous injection apparatus 110. A front end of the nozzle 111 has a circular face 111a having substantially the same curvature as that of a cylindrical drum 100, which will be described later and the same injection nozzle 111 is provided with a gap equal to the thickness of the aforementioned substrate 1 to be formed with respect to a curved face of the cylindrical drum 100. This injection nozzle 111 is constituted of a T-type die and molten resin 11 is injected continuously at a predetermined resin pressure and constant flow rate from a resin injection port 111b formed in the center of the circular face 111a.

Because the basic structure of the cylindrical drum 100 can be obtained by changing only part of the manufacturing apparatus disclosed in the aforementioned Japanese Patent Application Laid-Open No. 11-56413, its mechanism will be described only briefly. The cylindrical drum 100 is formed in the form of a hallow drum having a water-cooled jacket 100a as an internal cooling means and its peripheral face has a function for forming part of the molded surface fastener 10. This cylindrical drum 100 keeps the aforementioned gap with respect to the circular face 111a on the front end of the injection nozzle 111 and an axis of the cylindrical drum 100 is provided parallel to the injection port 111c.

Figure 9:
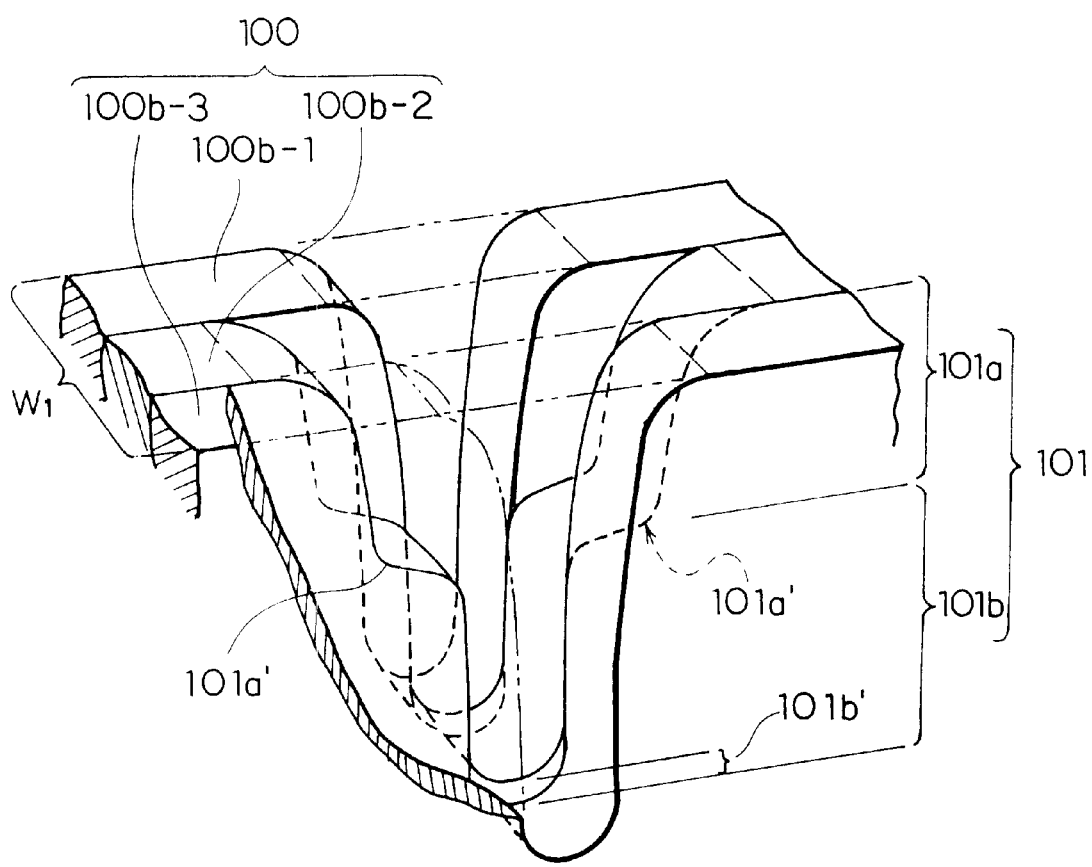
FIG. 9 is a partial perspective view showing a structure example of the preliminary element molding cavity according to the present invention.
Figure 10:
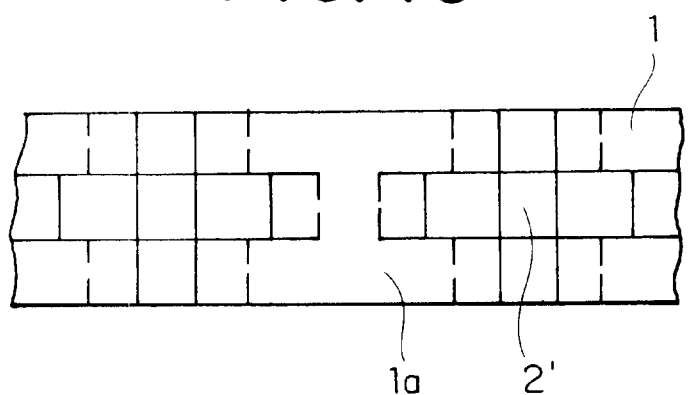
FIG. 10 is a plan view showing a structure example of the preliminary element molding element.
Figure 11:
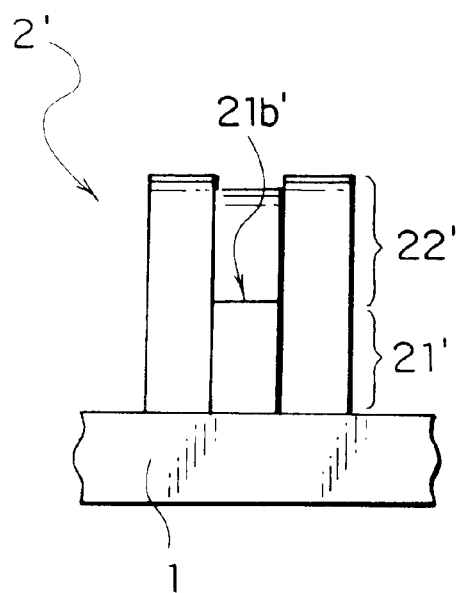
FIG. 11 is a side view of the same element molding element.
Figure 12:
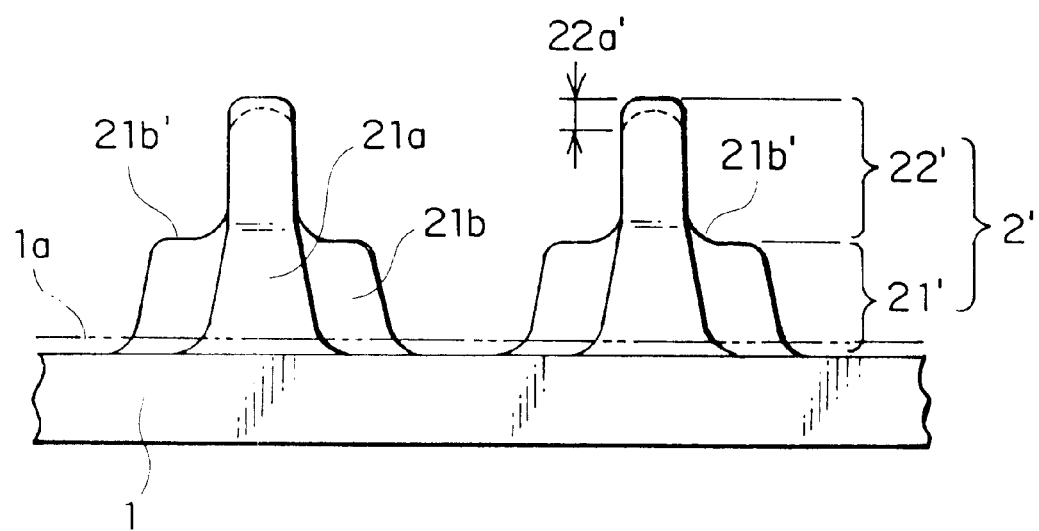
FIG. 12 is a front view of the same element molding element.
Figure 13:
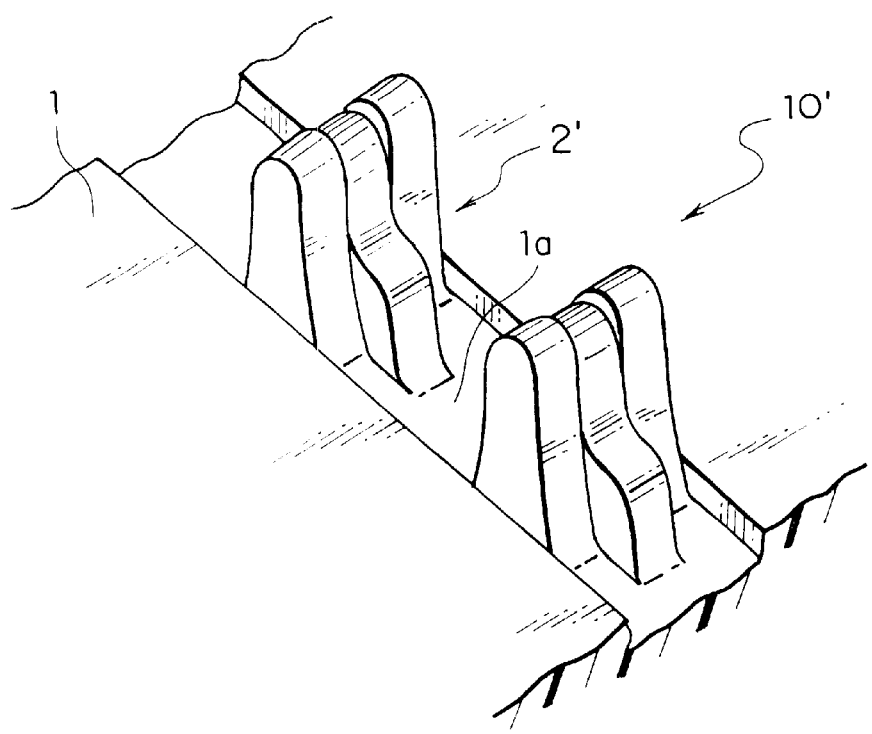
FIG. 13 is a partial perspective view showing an example of the configuration of the preliminarily molded element formed by the same cavity.

The most important component of the present invention is the rotation drum 100 and the feature of this rotation drum 100 exists in the structure of a preliminary engaging element molding cavity 101. As shown in FIG. 9, the cavity 101 of this embodiment is opened in the form of a cross in the peripheral face of the rotation drum 100, such that a cross shaped section hole portion 101a is formed up to a predetermined depth while a long hole portion 101b having an elongated section is formed in a direction along the intersection direction of the cross shaped section hole portion 101a. A bottom portion of this long hole portion 101b has two short branch portions 101b' branched from an end portion in the length direction so that the long hole portion 101b entirely provides two-branched fork configuration.

If the molten resin 11 is injected continuously from the injection nozzle 111 to the peripheral face of the cylindrical drum 100 which is rotated in a single direction, the substrate 1 is formed on the peripheral face of the drum and the cavity 101 is filled with part of the molten resin. Consequently, a preliminarily-molded element 2' is formed integrally on the rear side of the substrate 1. This preliminarily-molded element 2' is comprised of a preliminarily-molded column portion 21' extended from the proximal end portion to an intermediate portion and having a cross shaped section and a preliminarily-molded head 22' extended from the same preliminarily-molded column portion 21' to the top end with the elongated section and branched to two sections at the top end so that a U-shaped, V-shaped or lateral C-shaped two-branched portion 22a' is provided. In this way, a belt-like preliminarily-molded product 10' is formed continuously in the peripheral face of the rotating cylindrical drum 100.

The preliminarily-molded product 10' carried by the peripheral face of the cylindrical drum 100 is cooled positively by the water-cooled jacket 100a and a cooling water bath 102 in which a lower half portion of the cylindrical drum 100 is dipped and after that, separated from the peripheral face of the cylindrical drum 100 by a take-up roller 103, which is take-up means. Then, the preliminarily-molded product 10' is carried to a heating pressure portion 150 disposed in a next process by upper and lower feed rollers 104a and 104b.

Figures 8A, 8B:
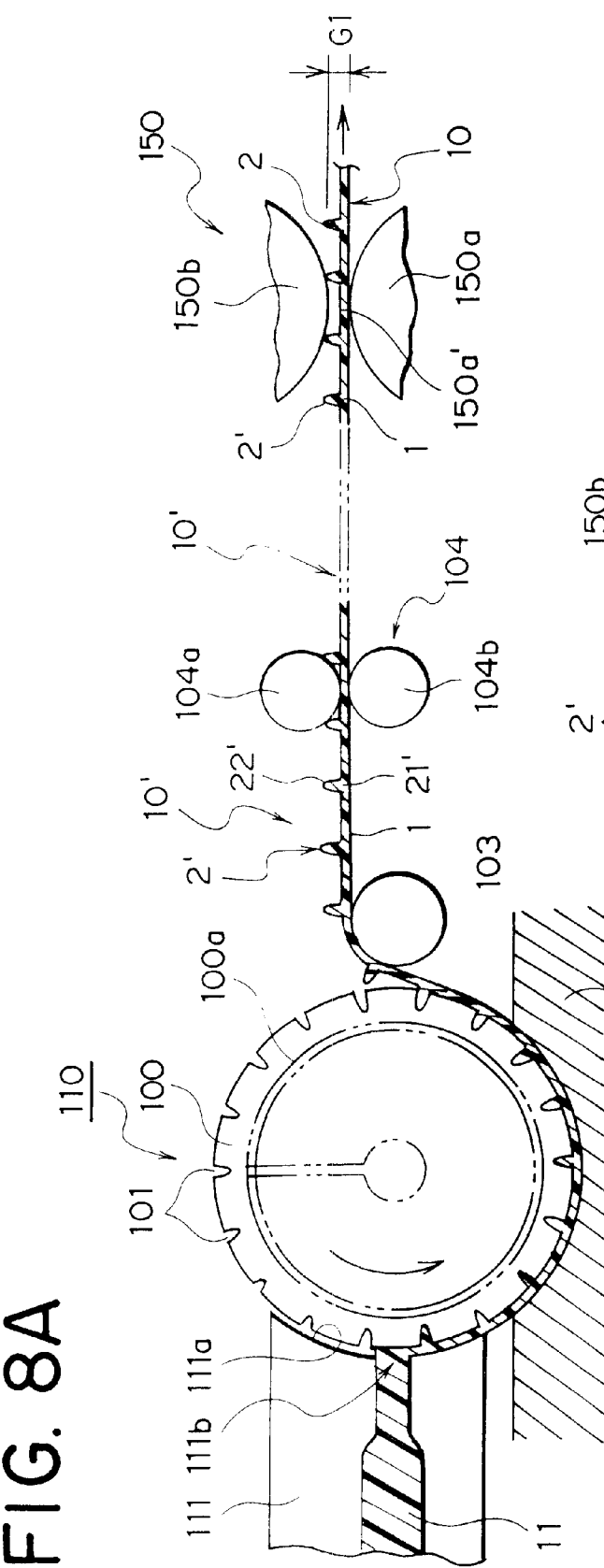
FIG. 8 is a process explanatory diagram schematically showing manufacturing process of the same molded surface fastener.

As shown in FIG. 8A, the heating pressure portion 150 comprises a lower roll 150a which has a rotation shaft extended perpendicularly to the transferring direction of the preliminarily-molded product 10' and a mounting/transferring face 150a' for supporting the same preliminarily-molded product 10' from down and an upper heating pressure roll 150b disposed with a predetermined gap G1 with respect to the mounting/transferring face 150a'. The gap G1 between the lower roll 150a and the upper heating roll 150b is set slightly smaller than a sum of the total dimension of the substrate 1 and the column portion 21 of the surface fastener of the present invention and the dimension in the vertical direction of the engaging head 22.

Although the heating pressure portion 150 of the present invention comprises the lower roll 150a and the upper heating pressure roll 150b, as shown in FIG. 8B, it may be composed of a lower supporting member 150a whose top face serves as a mounting/transferring face 150a' for the preliminarily-molded product 10' and an upper heating pressure member 150b having a downward-inclined slope 150c provided above the former one in the transferring direction of the preliminarily-molded product 10'. In this case, the gap G2 of the narrowest portion between the mounting/transferring face 150a of the upper heating pressure member 150b and the inclined slope 150c is set slightly smaller than the sum of the total dimension of the substrate 1 and the column portion 21 in the vertical direction and the dimension in the vertical direction of the engaging head 22.

FIG. 9 shows an example of the structure of the preliminary engaging element molding cavity 101 of this embodiment. In this case, the cylindrical drum 100 is formed by overlaying a plurality of thin ring-like discs 100b coaxially.

The same Figure indicates an example in which a single preliminary engaging element molding cavity 101 is formed with three first-third ring-like discs 100b-1 to 100b-3.

In the same Figure, the second ring-like disc 100b-2 to be sandwiched midway of the three ring-like discs 100b-1 to 100b-3 has predetermined cut-outs in the peripheral direction while the width of each thereof is gradually decreased slightly up to halfway and at the intermediate portion, reduced to substantially ⅓ via a step portion and kept substantially equal after this point. Consequently, the section of each cut-out portion is inversely projected from the peripheral face toward the center. On the other hand, the width of the initial cutout in the circumferential direction of the first and third ring-like discs 100b-1 and 100b-3, which sandwich the second ring-like disc 100b-2, is set smaller by about ½ than that of the initial cutout in the second ring-like disc 100b-2. They are cut out with the cutout width about ½ that of the second ring-like disc 100b-2 up to the step portion of the second ring-like disc 100b-2 and after that point, cut out linearly with the same width as the narrowed portion of the second ring-like disc 100-2.

When the ring-like discs 100b having the same shape having no cutout are overlaid on both sides of these first to third ring-like discs 100b-1 to 100b-3, a cross-shaped opening is formed in the circumferential face so that as described above, the preliminary engaging element molding cavity 101, comprised of the cross-shaped section hole portion 101a and the long hole portion 101b having the two-branched portion 101b' provided at the bottom portion, is formed.

Further, this cavity 101 is formed obliquely by 5 to 15° with respect to the rotation direction of the cylindrical drum 100. Consequently, when the preliminarily-molded product 10' is separated from the cylindrical drum 100, the preliminarily-molded element 10' comes to stand straight on the surface of the substrate 1.

FIG. 9 shows an example of the structure composed by overlaying a plurality of the ring-like discs 100c as described above. It is easily understood that the cavity 101 having the aforementioned hole structure can be formed in the circumferential face of the cylindrical drum compose of for example, single material by, for example, machining, electric discharge machining or etching. Meanwhile, the configuration of the preliminary engaging element molding cavity 101 is not restricted to the above-described one but may be changed appropriately.

The cylindrical drum 100 having such a structure is driven in a direction indicated by an arrow in FIG. 8 by a well known driving unit (not shown). As described above, the cylindrical drum 100 includes the water-cooled jacket 100b and the water cooling bath 102 is provided below the same drum 100, such that a substantially lower half portion of the cylindrical drum 100 is dipped in the water cooling bath 102. A pair of the take-up rolls 103, rear and front are provided obliquely above forward of this water cooling bath 102 and further, a trimming unit (not shown) having a cutting means for cutting the ear portion of the belt-like preliminarily-molded product 10', which is raw material of the molded surface fastener of final product of the present invention, is provided. The heating pressure unit 150 comprised of a pair of the rolls 150b and 150a, up and down, for forming the engaging head 22 through feed rollers 104a and 104b is provided in front of the same trimming unit.

The upper roll 150b contains a heat source (not shown) inside and its surface temperature is set to a temperature allowing application resin material to soften. A lower end of the circumferential face of the upper heating pressure roll 150b pressurizes the preliminarily molded head 22' of the engaging head 22 of the preliminarily-molded product 10' with heat so as to deform to a substantially rectangular thin plate-like engaging head 22. Thus, the heating pressure roll 150b is disposed such that its bottom end of the circumferential face thereof is lower than the apex point of the preliminarily molded head 22' being carried to the heating pressure unit 150 with the aforementioned gap G1.

On the other hand, a top face of the lower roll 150a disposed below the upper heating pressure roll 150b such that it opposes forms a mounting/transferring face 150a' for the bottom face of the substrate 1 of the preliminarily molded product 10'. The gap between the lower roll 150a and the upper heating pressure roll 150b is determined depending on a distance between the top face of the engaging head 22 of the molded surface fastener 10 to be manufactured and the bottom face of the substrate 1. The shaft position of the upper heating pressure roll 150b is adjustable by an adjusting means (not shown). The heating temperature of the heating pressure roll 150b can be adjusted appropriately depending on material of resin for use. Although the upper/lower rolls 150b and 150a may be rotated synchronously positively, at least the upper heating pressure roll 150b is connected to a driving source such as a driving motor (not shown) and driven.

A procedure for manufacturing the molded surface fastener 10 of the present invention by means of a molded surface fastener manufacturing apparatus having the above described structure will be described in detail with reference to FIGS. 8 and 9.

The molten resin 11 injected continuously from the injection nozzle 111 at a predetermined resin pressure is introduced continuously into a gap formed relative to the cylindrical drum 100 rotated in a single direction. By this introduction, the gap is filled with part of the molten resin 4 so as to mold the substrate 1. At the same time, the molding cavities 101 for the preliminarily molded element 2', formed in the circumferential face of the cylindrical drum 100, are filled with the molten resin 4 in succession. Consequently, as the cylindrical drum 100 is rotated, a plurality of the preliminarily molded elements 2', which are primary molded products are formed integrally on the surface of the substrate 1, so that the preliminarily molded product 10' having the preliminarily molded elements 2' having a peculiar configuration is molded continuously.

The preliminarily molded product 10' having the primary configuration of the surface fastener 10 of the present invention is guided and rotated along the circumference of the cylindrical drum 100 by substantially half turn of the cylindrical drum 100 by the take-up roll 103. In this while, the preliminarily molded product 10' is cooled positively through the water-cooled jacket 100b from inside of the cylindrical drum 100 and passed through inside of the water cooling bath 102 in which cooling water of low temperatures (about 15° C.) circulates, so that the preliminarily molded product 10' is cooled rapidly while hardening is accelerated. Because the primary surface fastener 10' is hardened by this rapid cooling before crystallization is progressed, the substrate 1 and the preliminarily molded element 2' are entirely formed with plasticity.

If the hardened preliminarily molded product 10' is pulled by a pair of the feed rolls 104a and 104b up and down through the take-up roller 103, the preliminarily molded elements 2' each having the configuration shown in FIGS. 10 to 13 are deformed elastically and pulled out smoothly. To separate the preliminarily molded product 10' from the cylindrical drum 100, the pair of the feed rolls 104a and 104b rotated synchronously in opposite directions are employed. The peripheral faces of the feed rolls 104a and 104b may be of a smooth face. Alternatively, it is permissible to form plural rows of guide grooves extended in the circumferential direction in the circumferential face in order to guide the preliminarily molded elements 2' or form an elastic layer (not shown) composed of mild urethane in order to protect the preliminarily molded element 2' form any damage.

The preliminarily molded product 10' formed on the circumference of the cylindrical drum 100 has a plurality of the preliminarily molded elements 2' erected substantially vertically from a surface of the substrate 1. According to this embodiment, the plurality of the preliminarily molded elements 2' have the fork-like preliminarily molded head 22' formed by the long hole portion 101b with the elongated section, having the branch portion 101b' at its deep portion in a direction perpendicular to a shoulder portion 21b', the preliminarily molded head being extended from the preliminarily molded column portion 21' having the cross-shaped section formed by the cross-shaped section hole portion 110a of the preliminary engaging element molding cavity 101.

When forming the preliminarily molded element 2', the height of the column portion 21' is set substantially equal to the height of the preliminarily molded head 22'. Then, by heating with pressure from above, by means of the heating pressure portion 150, only the preliminarily molded head 22' including the two-branched portion 22a is deformed to a substantially rectangular thin plate so as to mold the engaging head 22 of the present invention. Because deformation of the preliminarily molded product 10' by the aforementioned heating with pressure is limited to the preliminarily molded head 22', deformation of the preliminarily molded column portion 21' is not accompanied so that the configuration thereof is substantially not different from the column portion 21 of a finished product.

After the ear portions existing on the right and left in the width direction of the preliminarily molded product 10' are cut out by a trimming unit (not shown), the preliminarily molded product 10' formed by the cylindrical drum 100 is introduced in between the upper and lower rolls 150a and 150b of the heating pressure apparatus 150 through the feed rolls 104a and 104b. When it passes between these rolls 150a and 150b, the preliminarily molded head 22' is heated by the upper heating roll 150a and pressed from above. Consequently, it is softened from its apex to the shoulder portion 21'b of the column portion 21', so that a flat rectangular thin plate-like engaging head 22 is formed in a condition that a top face thereof is equal to the width of the shoulder portion 21b' of the second column portion 21b substantially at its flat plane P and the same head is extended in the width direction of the first column portion 21a.

When the preliminarily molded head 22' is deformed by heating with pressure, first, the two-branched portion 22a' formed at the front end portion of the preliminarily molded head 22' is softened so that it is deformed plastically into an oval thin plate and next, the recess in the center of the two-branched portion 22a' begins to be softened by heating so that it is deformed into a substantially rectangular thin plate extended in a direction in which the two-branched portion 22a' is disposed or in the width direction of the first column portion 21a having the cross-shaped section, produced by an intersection between the first column portion 21a and the second column portion 21b. At this time, the recess in the center of the two-branched portion 22a' is never affected by the two-branched portion 22a'. Therefore, this portion is flattened up to only about the width of the shoulder portion 21b' in the width direction of the second column portion 21b.

As described above, the engaging head 22, which is deformed to a substantially rectangular thin plate under a pressure applied in its softening state by heating, is cooled and hardened gradually so that crystallization of that heated portion is accelerated. Consequently, stiffness of the engaging head 22 becomes higher than those of the column portion 21 and the substrate 1. This means that of the substrate 1 and the engaging element 2 of the primary surface fastener 10' provided with an excellent plasticity generated by rapid hardening, only the engaging head 22 has a higher stiffness than the other portions. Thus, in the engaging element 2 of a molded surface fastener 10 of a minute size and having an extremely high plasticity, the stiffness of that engaging head 22 is secured so that a holding force along the separation direction with respect to the mating pile is secured. The molded surface fastener 10 having both characteristics about plasticity and minute configuration of the present invention ensures an excellent texture, a predetermined engaging force and a much stabilized configuration and further secures a high quality capable of bearing repeated use of several times sufficiently.

The engaging head 22 molded at this time entirely provides a substantially rectangular shape in plan view whose end portions are circular as shown in FIG. 1. Consequently, the engaging head 22 extended in the width direction of the first column portion 21a is formed at the top end of the first and second column portions 21a and 21b having the cross-shaped section composing the column portion 21 of the engaging element 2. The column portion 21 supporting this engaging head 22 has the cross-shaped section as described above and the second column portion 21a has no extension of the engaging head 22. Thus, substantially the same structure as that of the conventional hook type engaging head is ensured so that there never occur various problems described above, such as generation of a separation strength higher than necessary and hanging by the pile, which may occur in the mushroom type engaging head.

In this embodiment also, it is permissible to form a straight dented groove 1a connecting adjacent engaging elements 2 in the molding direction in the surface on the side in which the engaging elements 2 of the substrate 1 stand. To form this dented groove 1a, preliminary engaging element molding cavities 101 adjacent in the circumferential direction formed on the circumferential face of the cylindrical drum 100 are connected with each other by a protruded row having a rectangular section (not shown).

Although the present invention has been described about an example in which the engaging head 22 is extended in a direction perpendicular to the molding direction from the column portion 21, if the long hole portion 101b disposed at the deep side of the molding cavity 101 for the preliminarily-molded element 10' is formed such that it is longer in the molding direction, the engaging head 22 can be extended in the molding direction as shown in FIG. 5. If the cavities 101 are formed on the circumferential face of the cylindrical drum 100 with these molding directions mixed, it is possible to produce a molded surface fastener 10 in which the engaging elements 2 whose engaging head 22 is extended in a direction perpendicular to the molding direction and the engaging elements 2 whose engaging head 22 is extended in the molding direction are mixed.

Figure 14:
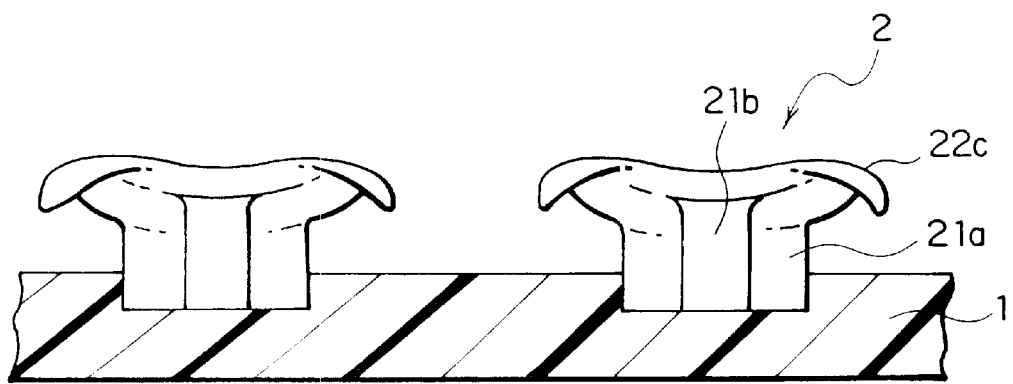
FIG. 14 is a side view showing an example of the final configuration of the molded surface fastener according to a second embodiment of the present invention.

FIG. 14 shows a configuration of a molded surface fastener 10 according to a second embodiment of the present invention. From the same Figure, it is understood that the front end portions of the engaging heads 22 of the first embodiment are bent downward. That is, according to this embodiment, the engaging head 22 is not formed to a mere flat plate but by curving the front ends on the extension sides downward in the form of a hook, a curved portion 22c is formed so as to intensify engagement strength and separation strength with the mating pile to a required level. In order to curve the front ends of the engaging head 22 downward in the form of a hook, when deforming the preliminarily molded element 2' of the preliminarily molded product 10' formed by the cylindrical drum 100 by heating with pressure by means of the heating pressure portion 150, heating temperature is set higher than ordinary fusion temperature or the pressing time is set relatively longer. Consequently, softening of the front ends of the engaging head 22 is accelerated so that they are curved due to their own weight.

Even if the engagement strength and separation strength are intensified by such hooking configuration of the engaging head, the engaging head can be released smoothly without any damage in the minute pile and engaging element when required, because each of the engaging heads 22 is extended from the column portion 21 only in a single direction but the engaging head is not extended in all directions.

The present invention includes a case of reducing the deformation amount of the preliminarily-molded head 22' in the pressing direction by the heating pressure portion 150. In this case, the proximal end portion on the side of the preliminarily-molded column portion 21' of the preliminarily-molded head 22' is left so that the neck portion (not shown) having the elongated section long in the extending direction is formed between the engaging head 22 and the column portion 21 having the cross-shaped section. When the mating pile engages the engaging head 22 such that it winds around the neck portion (not shown), if it is intended to release this engagement, the neck portion is inclined in the separation direction so as to introduce the pile in the separation direction and functions to remove the pile from the engaging head 22 easily accompanied by the deformation of the engaging head 22. If the stiffness of the engaging head 22 is too high, it is preferable that the aforementioned neck portion is formed.

Because according to the molded surface fastener having the above-described configuration and minute dimensions of the present invention, the engaging heads extended from the single column portion of each engaging element in opposite directions are of thin plate form, the front end portions thereof can invade into the mating pile having a minute dimension, for example, fine pile protruded from the surface of ordinary unwoven fabric easily. On the other hand, because the section of the column portion is cross-shaped, this column portion can secure substantially the same stiffness with a small amount of resin used as compared to the ordinary hallow column portion, so that the engaging element becomes unlikely to fall down.

Further, according to the present invention, the top face of the engaging head is formed substantially flat and the thickness in the vertical direction of the engaging head is formed such that it is decreased gradually toward the front end. Consequently, the texture of the engaging head is improved and the engaging head becomes likely to invade into the fine mating pile easily. As a result, the engaging head can engage a fine mating pile easily and securely without damaging its configuration and if a force in the separation direction is applied, the engaging head is deformed while the neck portion is distorted in the separation direction. Then, the pile is moved smoothly in a releasing direction along the periphery of the expanded portion with a predetermined friction, so that the pile can be released easily from the engaging head. Thus, the separation strength is not intensified excessively unlike the mushroom type.

The engaging element having the above-described configuration of the present invention ensures not only an excellent texture but also a secure engagement with even a fine pile. A predetermined holding force is secured with respect to an engaging pile and different from the conventional mushroom type or similar engaging element, any pile never winds around the neck portion between the column portion and the engaging head or no hanging of the pile on the neck portion is generated. Therefore, engagement between the pile and the engaging element can be released smoothly while securing a predetermined separation strength without damaging the pile and engaging element, thereby increasing durability.

In case of forming right and left expanded portions of the engaging head by applying the heating pressure means onto the engaging head of the primary surface fastener, which is hardened rapidly after formation, and cooling it gradually so that it is hardened, not only plasticity of the molded surface fastener is secured, but also stiffness of the engaging head is increased as compared to that of the other components, so that the holding force of the mating pile is further improved and stability of the configuration is secured.

Further, because the engaging head is supported securely by the cross-shaped section of the column portion at the proximal end thereof, the engaging head is never deformed resisting a pressure force applied thereto upon engagement, so that the engaging head invades into the mating pile easily, thereby improving the engagement ratio with the mating pile.

| | [Reference Numerals] |
|---|---|
| 10 | molded surface fastener |
| 10' | preliminarily molded product |
| 11 | molten resin |
| 1 | substrate |
| 2 | engaging element |
| 2' | preliminarily molded element |
| 21 | column portion |
| 21a | first column portion |
| 21b | second column portion |
| 21' | preliminarily molded column portion |
| 21b' | shoulder portion |
| 22 | engaging head |
| 22a | under face |
| 22b | top face |
| 22' | preliminarily molded head |
| 22a' | two-branched portion |
| 100 | cylindrical drum |
| 100a | water-cooled jacket |
| 100b, 100b-1 to 100b-3 | ring-like disc |
| 101 | cavity for molding the preliminarily molded element |
| 101a | cross-shaped section hole portion |
| 101a' | step portion |
| 101b | long-hole portion |
| 101b' | two-branched portion |
| 102 | water cooling bath |
| 103 | take-up roll |
| 104a, 104b | feed roller |
| 111 | injection nozzle |
| 111a | circular face |
| 111b | injection port |
| 150 | heating pressure portion |

| [Reference Numerals] | |
| --- | --- |
| 150a | lower roll |
| 150a' | mounting/transferring face |
| 150b | upper heating pressure roll |
| 150c | inclined slope |

What is claimed is:

1. An integral molded surface fastener of synthetic resin in which a plurality of minute engaging elements are molded integrally on a surface of a flat substrate for engaging/disengaging with mating pile pieces, wherein each of said engaging elements includes:

a single column portion having a substantially cross-shaped section constituted of a first column portion and a second column portion each having a necessary height and a necessary width in an intersecting direction parallel to the surface of said substrate; and substantially rectangular thin plate-like engaging heads being formed on a top end of said column portion, having substantially the same width dimension as a width dimension of the top end of said second column portion and extended in opposite directions along the width direction of said first column portion parallel to the surface of said flat substrate.

2. An integral molded surface fastener according to claim 1, wherein a width dimension of at least any one of said first and second column portions is decreased gradually toward said engaging head.

3. An integral molded surface fastener according to claim 1, wherein an under face of said engaging head is composed of a tapered face whose thickness is decreased from said first column portion toward a front end of the engaging head.

4. An integral molded surface fastener according to claim 1 or 3, wherein a top face of said engaging head is substantially flat.

5. An integral molded surface fastener according to claim 4, wherein a top face portion corresponding to a region supported by said column portion of said engaging head is formed such that it is slightly recessed with respect to the other top face portion.

6. An integral molded surface fastener according to claim 1, wherein each front end portion of said engaging heads is curved downward.

7. An integral molded surface fastener according to claim 1, wherein said substrate further includes a concave portion between adjacent engaging elements in a molding direction of said substrate.

8. An integral molded surface fastener according to claim 3, wherein a maximum thickness in the vertical direction of said engaging head is 0.2 to 1.1 mm.

9. An integral molded surface fastener according to claim 1, wherein a dimension between end portions in an extending direction of said engaging heads is 0.4 to 1.2 mm while a maximum width dimension thereof in a direction perpendicular to said extending direction is 0.2 to 1.2 mm.

10. An integral molded surface fastener according to claim 7, wherein an extending length of each of said engaging head from said first column portion is 0.08 to 0.5 mm.

11. An integral molded surface fastener according to claim 1 or 7, wherein a height from the surface of said substrate to a top face of said engaging head of said engaging element is 0.1 to 1.2 mm.

12. An integral molded surface fastener according to claim 1, wherein a total area of a top face of said engaging element is set to 20 to 50% of a surface area of the substrate.

13. An integral molded surface fastener according to claim 1, wherein said first column portion is disposed perpendicularly to the molding direction of said substrate while said second column portion is disposed in parallel to the molding direction of said substrate.

14. An integral molded surface fastener according to claim 1, wherein said first column portion is disposed in parallel to the molding direction of said substrate while said second column portion is disposed perpendicularly to the molding direction of said substrate.

15. An integral molded surface fastener according to claim 1, wherein engaging elements whose engaging heads are extended in the molding direction of said substrate and engaging elements whose engaging heads are extended in the direction perpendicular to the molding direction of said substrate are mixed.

16. An integral molded surface fastener according to claim 1, wherein engaging elements whose engaging heads are extended in the molding direction of said substrate and engaging elements whose engaging heads are extended in the direction perpendicular to the molding direction of said substrate are disposed alternately with respect to the molding direction of said substrate.

17. A manufacturing method for the integral molded surface fastener according to claim 1, comprising the steps of:

rotating in a single direction a cylindrical drum having a plurality of cavities for molding preliminarily molded engaging elements, each comprised of a cross-shaped section hole portion which is open in the shape of a cross on a peripheral face and extended up to a predetermined depth and a long hole portion extended in the molding direction or in a direction perpendicular to the molding direction, which is formed subsequent to said cross-shaped section hole portion and has an elongated section while a deep portion thereof is branched to two sections;

molding said substrate along the peripheral face of said cylindrical drum by injecting molten resin toward the peripheral face of said cylindrical drum continuously and filling said cavities with part of said molten resin so as to mold preliminarily molded elements each which is erected integrally with the rear face of said substrate and comprised of a preliminarily molded column portion extended from a proximal end to an intermediate portion and having a cross-shaped section and a preliminarily molded head extended from the preliminarily molded column portion to a top end and having an elongated section with the top end branched to two sections;

separating a belt-like preliminarily molded product having said preliminarily molded elements on said substrate transferred by the peripheral face of said rotating cylindrical drum from the peripheral face of said cylindrical drum;

transferring the separated preliminarily molded products continuously to a heating pressure portion; and deforming with melting said preliminarily molded head of said preliminarily molded element erected integrally from the surface of the substrate of the transferred preliminarily molded product to a flat rectangular thin plate by heating with pressure by said heating pressure portion so as to mold said engaging heads at the top end of said column portion successively.

18. A continuous manufacturing apparatus for the integral molded surface fastener according to claim 1, comprising:

a cylindrical drum rotating in a single direction and having a plurality of cavities for molding preliminarily molded elements, each comprised of a cross-shaped section hole portion which is open in the shape of a cross on a peripheral face and extended up to a predetermined depth and a long hole portion extended in the molding direction or in a direction perpendicular to the molding direction, which is formed subsequent to said cross-shaped section hole portion and has an elongated section while a deep portion thereof is branched to two sections;

a continuous injecting device for molding said substrate along the peripheral face of said cylindrical drum by injecting molten resin toward the peripheral face of said cylindrical drum and filling said cavities with part of said molten resin so as to mold preliminarily molded elements each which is erected integrally with the rear face of said substrate and comprised of a preliminarily molded column portion extended from a proximal end to an intermediate portion and having a cross-shaped section and a preliminarily molded head extended from the preliminarily molded column portion to a top end and has an elongated section with the top end branched to two sections;

take-up means for continuously separating a belt-like preliminarily molded product having said preliminarily molded element on said substrate transferred by the peripheral face of said rotating cylindrical drum from the peripheral face of said cylindrical drum; and a heating pressure portion for deforming with melting said preliminarily molded head of said preliminarily molded element erected integrally from the surface of the substrate of the separated preliminarily molded product to a flat rectangular thin plate by heating with pressure so as to mold said engaging heads continuously.

19. A continuous manufacturing apparatus according to claim 18, wherein said heating pressure portion comprises a mounting/transferring face for said preliminarily molded product and a heating pressure roll included in an upper plane parallel to said mounting/transferring face and having a shaft extended in a direction perpendicular to the transferring direction of said preliminarily molded product; and a gap between a lower end position of said heating pressure roll and said mounting/transferring face is smaller than a sum of a total dimension in the vertical direction of said substrate and said column portion and a dimension in the vertical direction of said engaging head.

20. A continuous manufacturing apparatus according to claim 18, wherein said heating pressure portion comprises a mounting/transferring face for said preliminarily molded product and a heating member which is disposed above said mounting/transferring face and has an inclined face in which a gap between an under face thereof and said mounting/transferring face is decreased gradually; and a gap of the narrowest portion between said mounting/transferring face and said inclined face is smaller than a sum of a total dimension in the vertical direction of said substrate and said column portion and a dimension in the vertical direction of said engaging head.

* * * * *